United States Patent
Jalkanen et al.

(10) Patent No.: US 11,218,550 B2
(45) Date of Patent: Jan. 4, 2022

(54) SETUP OF COMMUNICATION SESSION

(71) Applicant: TELIA COMPANY AB, Solna (SE)

(72) Inventors: Tero Jalkanen, Tuusula (FI); Tomi Sarajisto, Helsinki (FI)

(73) Assignee: TELIA COMPANY AB, Solna (SE)

( * ) Notice: Subject to any disclaimer, the term of this patent is extended or adjusted under 35 U.S.C. 154(b) by 0 days.

(21) Appl. No.: 17/159,752

(22) Filed: Jan. 27, 2021

(65) Prior Publication Data

US 2021/0234928 A1  Jul. 29, 2021

(30) Foreign Application Priority Data

Jan. 27, 2020  (FI) .................................... 20205076

(51) Int. Cl.
  *G06F 15/16* (2006.01)
  *H04L 29/08* (2006.01)
  *H04W 88/02* (2009.01)

(52) U.S. Cl.
  CPC .......... *H04L 67/141* (2013.01); *H04L 67/146* (2013.01); *H04W 88/02* (2013.01)

(58) Field of Classification Search
  CPC ..... H04L 67/141; H04L 67/146; H04W 88/02
  USPC ........................................................ 709/227
  See application file for complete search history.

(56) References Cited

U.S. PATENT DOCUMENTS

| | | | |
|---|---|---|---|
| 10,484,911 B1 | 11/2019 | Bogineni et al. | |
| 2018/0227873 A1 | 8/2018 | Vrzic et al. | |
| 2018/0317157 A1 | 11/2018 | Baek et al. | |
| 2019/0029065 A1 | 1/2019 | Park et al. | |
| 2019/0174449 A1* | 6/2019 | Shan ...................... | H04W 60/00 |
| 2020/0053828 A1* | 2/2020 | Bharatia ............. | H04W 68/005 |
| 2020/0163008 A1* | 5/2020 | Hedman ............... | H04W 80/10 |
| 2021/0037496 A1* | 2/2021 | Ryu ....................... | H04B 7/195 |

FOREIGN PATENT DOCUMENTS

EP  3 442 202  2/2019

OTHER PUBLICATIONS

Search Report for FI20205076, dated Aug. 19, 2020, 1 page.
European Search Report issued in European Patent Application No. 21153161.1 dated May 31, 2021.
Motorola Mobility et al., "Conclusions about UEs not supporting NAS over WLAN access," 3GPP, SA WG2 TD, SA WG2 Temporary Document; S2-1811837, SA WG2 Meeting #129bis, Nov. 26-30, 2018, West Palm Beach, USA, 19 pages.

* cited by examiner

*Primary Examiner* — Atta Khan
(74) *Attorney, Agent, or Firm* — Nixon & Vanderhye

(57) ABSTRACT

Disclosed is a method for setting up a communication session to a terminal device. The method includes: receiving a registration request from the terminal device, the registration request including a unique transaction identifier for the terminal device; assigning a network slice; assigning a charging and policy scheme; and in response to an assignment of the network slice and an assignment of the charging and policy scheme for the communication session generating an acknowledgement to the terminal device. Also disclosed is a network node, to a communication system and a computer program product.

14 Claims, 3 Drawing Sheets

SETUP OF COMMUNICATION SESSION

This application claims priority to FI Patent Application No. 20205076 filed 27 Jan. 2020, the entire contents of which is hereby incorporated by reference.

TECHNICAL FIELD

The invention concerns in general the technical field of telecommunications. More particularly, the invention concerns service provision in a mobile communication network.

BACKGROUND

The 5th generation wireless communication technology (5G) is based on a so-called network slicing concept as schematically illustrated in FIG. 1. A network slicing refers to an implementation in which a physical infrastructure of a telecommunication network 100 is shared between service providers 110 executing virtual logical networks created on a top of the physical infrastructure. In that manner it is possible to establish an independent set of logical network functions for each virtual network to dedicate the network slice in question to different application areas 120. This kind of conceptual thinking allows to define network performance parameters and functions optimal to each use case. As regards to the non-limiting example of FIG. 1 it may be arranged that a first slice (SLICE 1) is dedicated to providing multimedia services as application area 1 and, thus, serving clients requiring services in that area. For example, a requirement for a communication service, and, thus, to the corresponding slice, may e.g. be a broadband communication. On the other hand, a second slice (SLICE 2) may relate to so-called IoT communication which means that a significant amount of resources of a mobile communication network 100 resources shall be allocated to this slice, since an amount of communication may be huge. Still further, in a third slice (SLICE 3) an essential feature is that a latency in the communication is low, which may e.g. relate to a communication of connected vehicles, and for that reason the slice in question may be harnessed to provide low latency communication service. In at least some embodiment, one slice (SLICE 4) may be reserved for other service types. In the described manner, resources of the mobile communication network 100 may be optimally directed according to the service needs and, in that manner, allowing the service providers, such as virtual network operators, to serve the subscribers in a better way. As said, an example of a communication system implementing the slicing concept is so-called 5G communication network system.

In view of above, there is need to develop mechanisms and solutions for setting up a communication connection in the sliced communication network environment.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present a method, a network node, a communication system and a computer program product for setting up a communication session to a terminal device.

The objects of the invention are reached by a method, a network node, a communication system and a computer program product as defined by the respective independent claims.

According to a first aspect, a method for setting up a communication session to a terminal device is provided, the method comprises: receiving, by a network node implementing at least an access and mobility function, AMF, a registration request from the terminal device, the registration request comprising data indicating a unique transaction identifier for the terminal device; assigning, by the network node implementing at least the access and mobility function, AMF, on a basis of the unique transaction identifier a network slice of a mobile communication network providing communication service to the terminal device, the network slice being accessible with a session management function initiated for the terminal device; assigning, by the network node implementing at least the access and mobility function, AMF, a charging and policy scheme to be applied to the terminal device, the charging and policy scheme being accessible with an application function initiated for the terminal device; in response to an assignment of the network slice and an assignment of the charging and policy scheme for the communication session generating an acknowledgement to the terminal device, the acknowledgement indicating an acceptance to the registration request for causing a setup of the communication session between the terminal device and the application function through a user plane function.

Moreover, the assignment of the network slice may be performed in response to an inquiry to a network slice selection function, the inquiry comprising data indicating the unique transaction identifier for the terminal device.

The assignment of the charging and policy scheme may be performed in response to an inquiry to a policy control function, the inquiry comprising data indicating the unique transaction identifier for the terminal device.

According to a second aspect, a network node is provided, the network node comprising: at least one processor; at least one memory including computer program code; the at least one memory and the computer program code configured to, with the at least one processor, cause the network node to perform: receive a registration request from a terminal device, the registration request comprising data indicating a unique transaction identifier for the terminal device; assign on a basis of the unique transaction identifier a network slice of a mobile communication network providing communication service to the terminal device, the network slice being accessible with a session management function initiated for the terminal device, assign a charging and policy scheme to be applied to the terminal device; the charging and policy scheme being accessible with an application function initiated for the terminal device; in response to an assignment of the network slice and an assignment of the charging and policy scheme for the communication session generate an acknowledgement to the terminal device, the acknowledgement indicating an acceptance to the registration request for causing a setup of the communication session between the terminal device and the application function through a user plane function.

Moreover, the network node may be caused to perform the assignment of the network slice in response to an inquiry to a network slice selection function, the inquiry comprising data indicating the unique transaction identifier for the terminal device.

The network node may be caused to perform the assignment of the charging and policy scheme in response to an inquiry to a policy control function, the inquiry comprising data indicating the unique transaction identifier for the terminal device.

For example, the network node may be an access and mobility function, AMF.

According to a third aspect, a communication system is provided, the communication system comprising a network node according to the second aspect defined in the foregoing description.

According to a fourth aspect, a computer program product for setting up a communication session is provided which computer program product, when executed by at least one processor, cause a network node to perform the method according to the first aspect defined in the foregoing description.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 2:
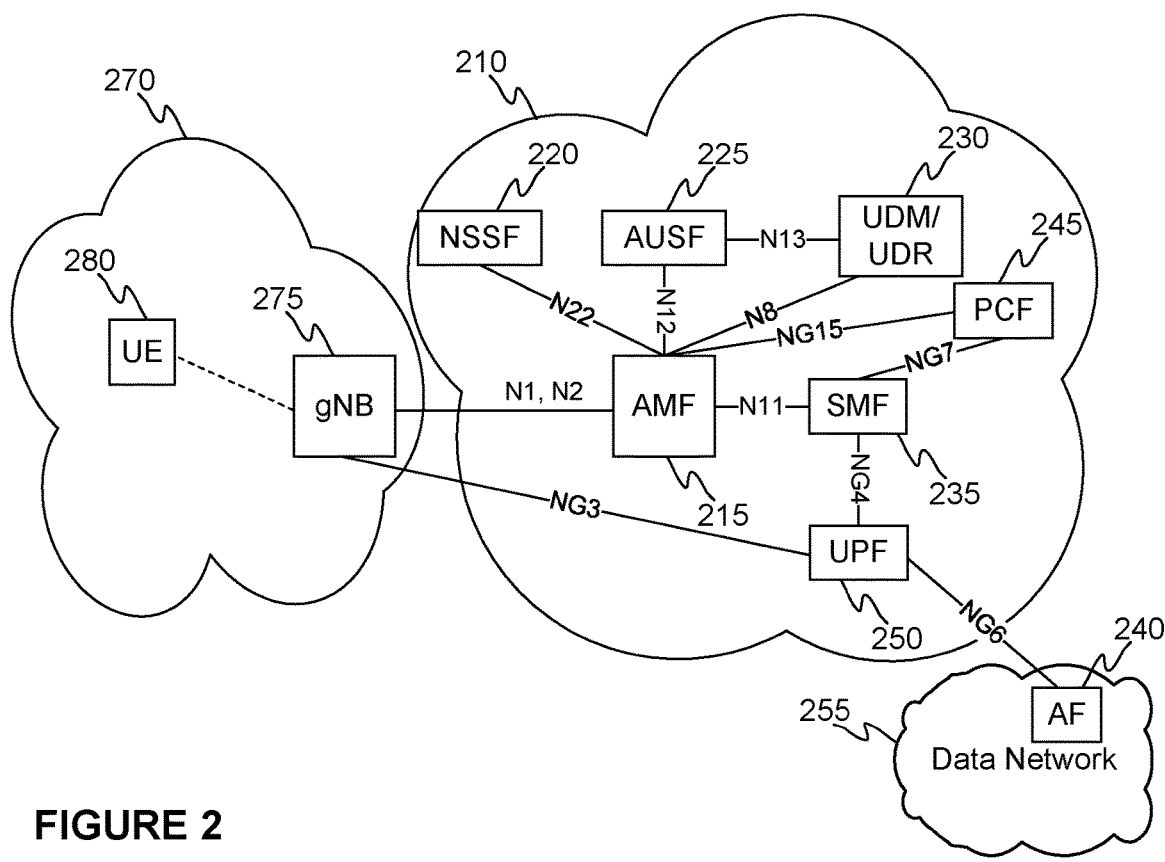
FIG. 2 illustrates schematically an example of a 5G network architecture according to an example embodiment of the invention.

In order to describe at least some aspects according to an embodiment of the invention a referral is made to FIG. 2. FIG. 2 illustrates schematically at least some entities in a core network 210 and in a radio access network 270 of a 5G network arranged to serve a terminal device 280. For a purpose of describing at least some aspects of the present invention the core network 210 comprises at least the following entities/functions:
- AMF 215 (Access and Mobility Management Function); responsible for handling connection and mobility management tasks
- NSSF 220 (Network Slice Selection Function); assists AMF 215 with a selection of a network slice instances by determining NSSI (Network Slice Selection Assistance Information) supplied to the terminal device 280
- AUSF 225 (Authentication Server Function); being involved in network security process, and especially in authentication
- UDM/UDR 230 (Unified Data Management/Unified Data Repository); supports the ARPF (Authentication Credential Repository and Processing Function) and stores the long-term security credentials used in authentication for AKA. In addition, it stores subscription information
- SMF 235 (Session Management Function); performs various functionalities relating to subscriber sessions, e.g. session establishment, modify and release
- AF 240 (Application Function); provides session related information to a PCRF (Policy and Charging Rules Function)
- PCF 245 (Policy Control Function); supports a unified policy framework that governs network behavior. Thus, it provides policy rules to control plane function(s) to enforce them. To facilitate this the subscription information is gathered from the Unified Data Management function
- UPF 250 (User Plane Function); The UPF supports features and capabilities to facilitate user plane operation, such as packet routing and forwarding, interconnection to a data network 255, policy enforcement and data buffering As is derivable from above a 5G architecture is definable as a functional architecture wherein functions are executed by an applicable physical device or devices. Still further, interfaces between the mentioned functions, and other functions not disclosed in FIG. 2, are defined and implemented as indicated in FIG. 2.

Still further, the radio access network 270 of 5G communication network comprises one or more Next Generation Node B (gNB) 275 supporting at least so-called 5G NR (New Radio) air interface for communicating with terminal devices 280.

Figure 3:
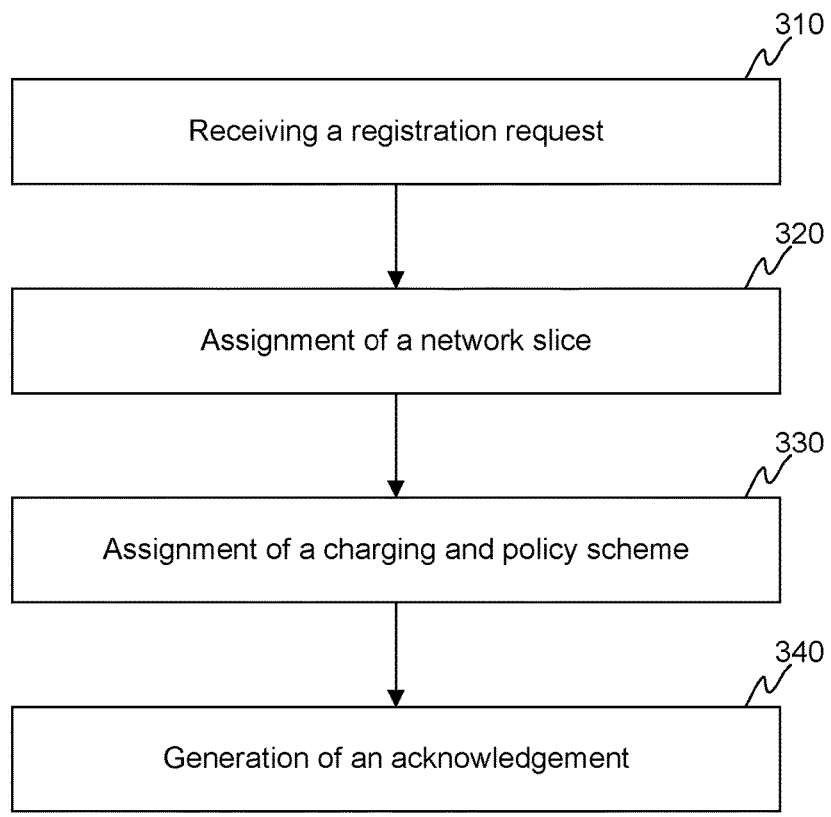
FIG. 3 illustrates schematically a method according to an example embodiment of the invention.

FIG. 3 illustrates schematically an example of a method for setting up a communication session to a terminal device 280 according to an embodiment of the invention. In order to initiate a setup of the communication session the terminal device 280 may be arranged to generate a registration request e.g. in response to a user interaction with the terminal device 280 or automatically e.g. in response to a detection that one or more predetermined conditions are fulfilled. The generation of the registration request may comprise, but is not limited to, an insertion of a unique transaction identifier representing the terminal device 280, or the user, in the registration request. The unique transaction identifier may be established by manipulating a typically used non-IMSI (International Mobile Subscription Identifier) based user identifier so that it also comprises an identifier of a transaction relating to the communication session to be established. Such an identifier of the transaction may represent a mission to be accomplished with the communication session, or any particulars being relevant in the communication session to be established. According to some embodiments the identifier of the transaction may indicate a group the user belongs to, which may be used for reporting, billing and prioritization purposes if desired. In other words, in accordance with at least some embodiments of the present invention the typically used non-IMSI based user identifier username@realm may be modified to a form [ID].username@realm (e.g. wherein the [ID] portion may be expressed in a form of ABC-running_number, wherein the ABC determines the service provider in question and the running_number a task defined to the subscription) or in case the group is indicated to a form [GroupID].username1@realm or username1@[GroupID].realm. In any case, the portion representing the identifier of the transaction provides further information to be used for setting up the communication session as will be described in the forthcoming description. As mentioned, the terminal device 280 generates the registration request with the data as indicated and transmits it towards the core network 210, and specifically to the Access and Mobility Management Function AMF 215, over the radio access network 270. In other words, the AMF 215 receives 310 the registration request from the terminal device 280. In some embodiments according to the present invention the registration request may correspond to so-called attach request message.

For sake of clarity it is worthwhile to mention that the identifier of the transaction represented e.g. with the [ID] or [GroupID] portion in the above described user identifiers may be used for identifying a purpose of use and/or targeting actions in the communication network (e.g. beamforming, slicing, enabling Multi-access Edge Computing (MEC) service, Local Break Out (LBO) service, and so on). Moreover, it is worthwhile to mention that a computing platform applied to a management of a number of subscriptions, such as dedicated to machine-to-machine communication, may be formed so as to serve the above described group-based approach. This may be achieved by arranging a data field in a context of subscription identifiers, such as MSISDN numbers, defining a group a subscription in question belongs to. Data defined in such a field may then be used e.g. for allocating tasks to subscribers belonging to a certain group.

Figure 1:
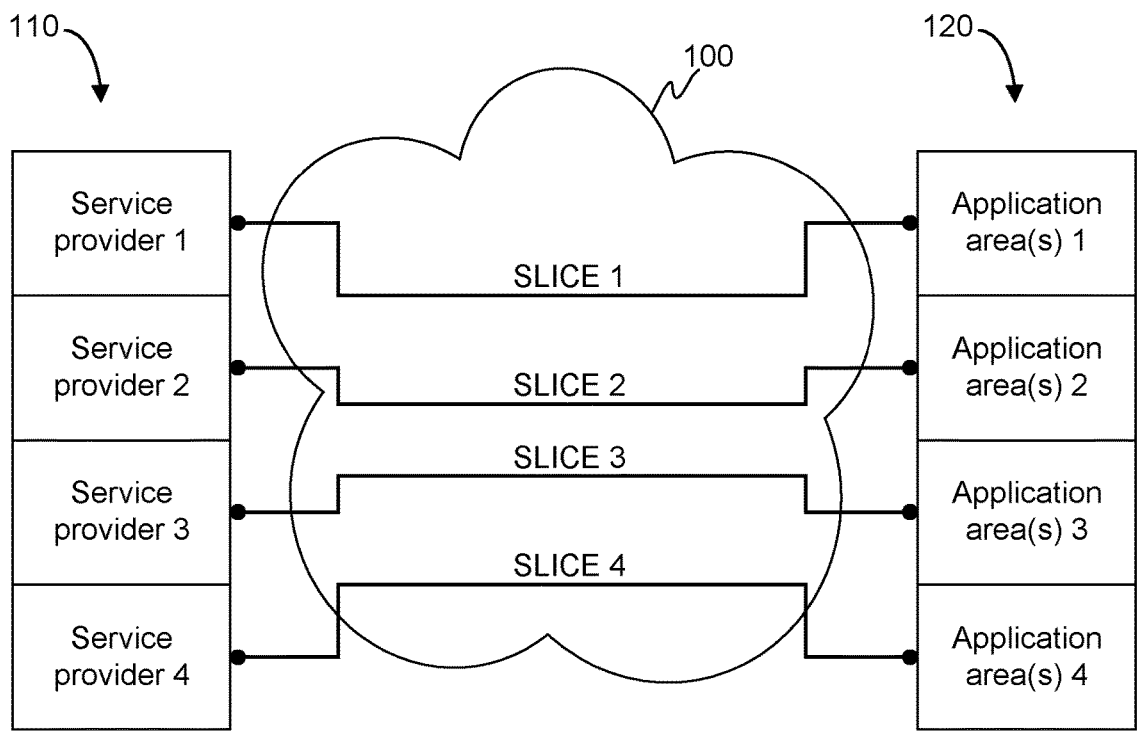
FIG. 1 illustrates schematically a slicing concept of 5G communication system.

In response to a receipt 310 of the registration request from the terminal device 280 over the communication network the AMF 215 is arranged to determine the unique transaction identifier from the registration request and to determine a network slice from a plurality of network slices arranged for different purposes as discussed in a context of FIG. 1. Naturally, prior to taking any steps in this regard the AMF 215 may perform authentication of the user through a communication with the UDM/UDR 230, wherein the authentication is performed by checking information carried in the unique transaction identifier from the UDM/UDR 230. If the authentication is performed and is confirmed, the determination of the network slice may be performed. Moreover, if no authentication procedure is applied to, the process continues directly by determining the network slice, as will be described. The determination of the network slice may be performed on a basis of the unique transaction identifier by requesting, by the AMF 215 from the NSSF 220, a selection of the network slice by generating so-called Slice Selection Request message to NSSF 220. The request may comprise the unique transaction identifier, or at least relevant parts of it, for selecting the applicable network slice. The NSSF 220 may detect at least some details relating to the requested communication session, such as the mission of the communication session on the basis of the unique transaction identifier, and is arranged to match an applicable network slice suitable to provide communication service required to accomplish the mission. As a non-limiting example, the communication session may be established to serving a drone. The unique transaction identifier may indicate e.g. a service provider of the drone and a mission to be accomplished with the drone. Based on this, the suitable slice may be determined which is hosted by a network service provider providing services to a certain customer segment, such as to service provider of the drone. More specifically, the NSSF 220 may be arranged to determine a suitable network slice, and hence a suitable AMF, by generating a query to a Network Function Repository Function (NRF) supporting a service discover function. As a result, the NSSF 220 provides so-called NSI (Network Slice Instance) identifier(s), allowed S-NSSAI(s) (Single-Network Slice Selection Assistance Information) and AMF candidate(s) to the AMF 215 which initiated the inquiry. Hence, as a result of the determination of the network slice on the basis of the unique transaction identifier, the determined network slice may be assigned 320 to the terminal device 280 which allows a Session Management Function SMF 235 initiated by the AMF 215 in response to a receipt of the registration request from the terminal device 280 to access to the assigned network slice i.e. at least to control a utilization of the communication resources reserved for the network slice. In this regard, the AMF 215 may send a registration accept message including allowed S-NSSAI(s) to the terminal device 280.

Moreover, in response to a receipt of the registration request with the unique transaction identifier a determination of a charging and policy scheme to be applied to the terminal device 280 in the communication session is performed. The charging and policy scheme may be determined by arranging the AMF 215 to inquire it from the Policy Control Function PCF 245 the unique transaction identifier as a parameter in the inquiry. Since the service provider in question has created an agreement, i.e. service level agreement defining the charging and policy scheme, with a telecom operator providing the network and, hence, the network slices, the PCF 245 may generate data, based on information obtainable from data storage on the basis of the parameter, indicating the charging and policy scheme to be applied to, and returns the data to the AMF 215 causing an assignment 330 of the charging and policy scheme to the terminal device 280 in question. The charging and policy scheme to be applied is accessible with the application function initiated in the network side for the terminal device 280 in question in order to generate session related information to a PCRF (Policy and Charging Rules Function).

For sake of clarity it is worthwhile to mention that the steps of assigning the network slice 320 and the step of assigning the charging and policy scheme 330 may be performed consecutively to each other, as shown in FIG. 3, or concurrently at least in part.

In response to the assignment of the network slice 320 and the assignment of the charging and policy scheme 330 for the communication session the AMF 215 may be arranged to generate 340 an acknowledgement to the terminal device 280. The acknowledgement may at least indicate an acceptance of the registration request causing a setup of the communication session between the terminal device 280 and a user plane function 250. Hence, the terminal device 280 may communicate with an entity, such as with the application function, AF, 240, residing in the data network 255 over the communication session. For example, the entity may provide service to the terminal device 280 for accomplishing the mission, or task, over the selected network slice.

Figure 4:
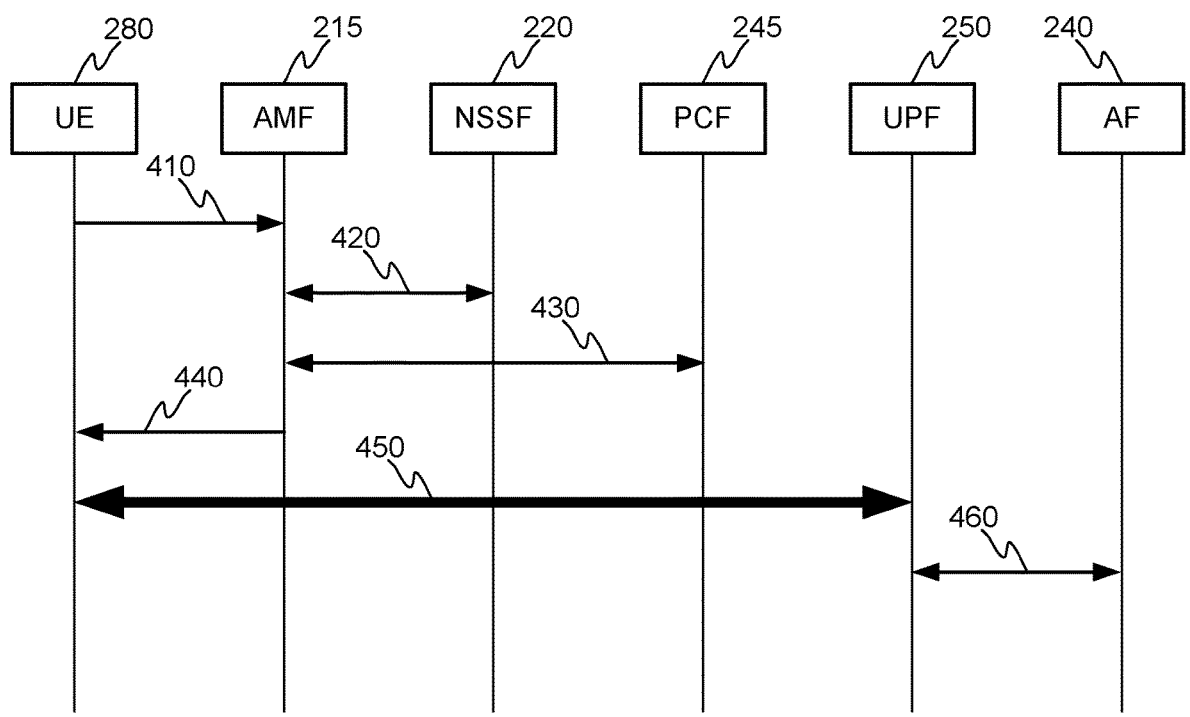
FIG. 4 illustrates schematically an example of signaling in an example embodiment of the invention.

FIG. 4 illustrates schematically an example of the method according to an embodiment of the invention as a flow chart. In FIG. 4 signals being relevant to understand the present invention are disclosed. The signal 410 in FIG. 4 represents a registration request transmitted from the terminal device 280 to the AMF 215. In response to a receipt 310 of the signal 410 the AMF 215 is arranged to generate a signal towards NSSF 220 for achieving an assignment 320 of a network slice to the terminal device 280. In order to reach the assignment of the network slice 320 the unique transaction identifier is used as a parameter for determining an applicable slice. Signal 420 in FIG. 4 represents an interaction between the mentioned entities for reaching the assignment of the network slice. Correspondingly, in response to a receipt 310 of the signal 410 the AMF 215 may also be arranged to generate a signal towards PCF 245 as described for achieving an assignment 330 of a charging and policy scheme to the terminal device 280 to be applied in the communication session over the network slice. In order to reach the assignment 330 of the charging and policy scheme the unique transaction identifier is used as a parameter for determining the charging and policy scheme to be applied to the terminal device 280 as described in the foregoing description. Signal 430 in FIG. 4 represents an interaction between the mentioned entities for reaching the assignment 330 of the charging and policy scheme. In response to the successful assignments 320, 330 the AMF 215 generates 340 the acknowledgement 440 to the terminal device 280. The acknowledgement 440 may comprise data indicating the network slice to be used in the communication session as well as data representing aspects relating to the charging and policy scheme to be applied. For example, the pieces of data may comprise information on suitable, or selected, SMF 235 and UPF 250. In response to a receipt of the pieces of data the terminal device 280 may establish 450 the communication session over the selected UPF 250 which is arranged to forward the data traffic to the application function, AF, 240 by the UPF 250 over the data network 255.

Figure 5:
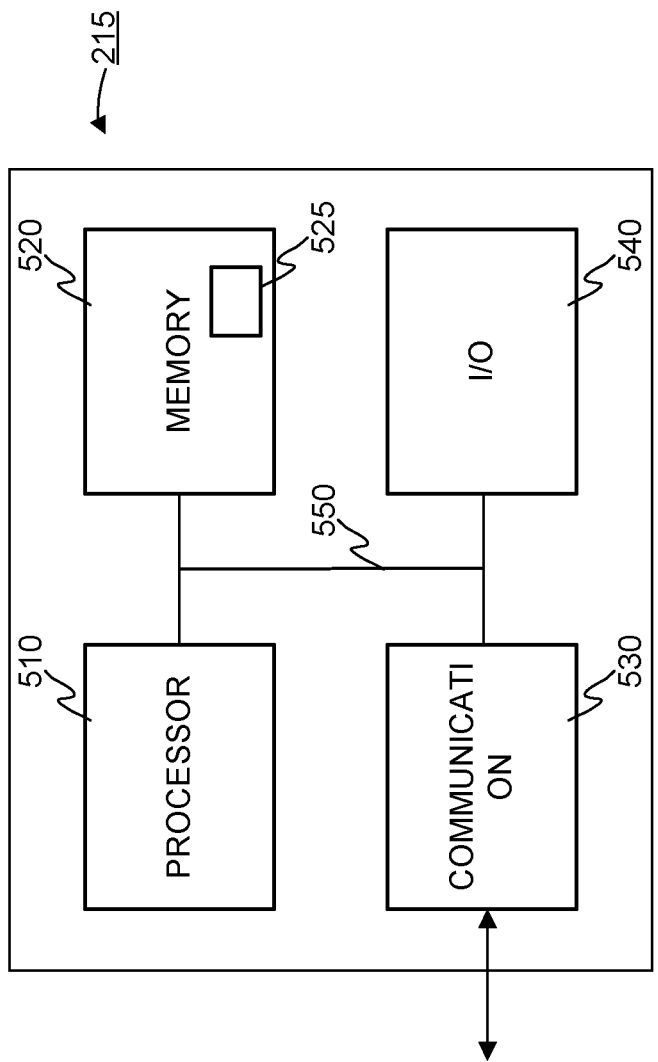
FIG. 5 illustrates schematically a network node according to an example embodiment of the invention.

As discussed above, a network node arranged to perform functionalities of an Access and Mobility Management Function, AMF, may perform at least some steps of the method as described. FIG. 5 illustrates schematically as a block diagram a non-limiting example of the network node applicable to perform the method. The block diagram of FIG. 5 depicts some components of an apparatus that may be employed to implement an operation of the network node. The apparatus comprises a processor 510 and a memory 520. The memory 520 may store data and computer program code 525. The apparatus may further comprise communication means 530 for wired and/or wireless communication with other apparatuses, such as other network nodes implementing the functionalities as described. Furthermore, I/O (input/output) components 540 may be arranged, together with the processor 510 and a portion of the computer program code 525, to provide a user interface for receiving input from a user and/or providing output to the user. In particular, the user I/O components may include user input means, such as one or more keys or buttons, a keyboard, a touchscreen or a touchpad, etc. The user I/O components may include output means, such as a display or a touchscreen. The components of the apparatus may be communicatively coupled to each other via a bus 550 that enables transfer of data and control information between the components.

The memory 520 and a portion of the computer program code 525 stored therein may be further arranged, with the processor 510, to cause the apparatus, i.e. the network node to perform a method as described in the foregoing description.

The processor 510 may be configured to read from and write to the memory 520. Although the processor 510 is depicted as a respective single component, it may be implemented as respective one or more separate processing components. Similarly, although the memory 520 is depicted as a respective single component, it may be implemented as respective one or more separate components, some or all of which may be integrated/removable and/or may provide permanent/semi-permanent/dynamic/cached storage.

The computer program code 525 may comprise computer-executable instructions that implement functions that correspond to steps of the method as will be described when loaded into the processor 510. As an example, the computer program code 525 may include a computer program consisting of one or more sequences of one or more instructions. The processor 510 is able to load and execute the computer program by reading the one or more sequences of one or more instructions included therein from the memory 520. The one or more sequences of one or more instructions may be configured to, when executed by the processor 510, cause the apparatus to perform the method be described. Hence, the apparatus may comprise at least one processor 510 and at least one memory 520 including the computer program code 525 for one or more programs, the at least one memory 520 and the computer program code 525 configured to, with the at least one processor 510, cause the apparatus to perform the method as described.

The computer program code 525 may be provided e.g. a computer program product comprising at least one computer-readable non-transitory medium having the computer program code 525 stored thereon, which computer program code 525, when executed by the processor 510 causes the apparatus to perform the method. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Still further, the computer program code 525 may comprise a proprietary application, such as computer program code for executing the setup of the communication session in the manner as described.

Any of the programmed functions mentioned may also be performed in firmware or hardware adapted to or programmed to perform the necessary tasks.

Some aspects of the present invention relate to a communication system comprising a network node implementing the method as described.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for setting up a communication session to a terminal device, the method comprises:

receiving, by a network node implementing at least an access and mobility function, AMF, a registration request from the terminal device, the registration request comprising data indicating a unique transaction identifier for the terminal device, assigning, by the network node implementing at least the access and mobility function, AMF, on a basis of the unique transaction identifier a network slice of a mobile communication network providing communication service to the terminal device, the network slice being accessible with a session management function initiated for the terminal device, assigning, by the network node implementing at least the access and mobility function, AMF, a charging and policy scheme to be applied to the terminal device, the charging and policy scheme being accessible with an application function initiated for the terminal device, generating, in response to an assignment of the network slice and an assignment of the charging and policy scheme for the communication session, an acknowledgement to the terminal device, the acknowledgement indicating an acceptance to the registration request for causing a setup of the communication session between the terminal device and the application function through a user plane function.

2. The method of claim 1, wherein the assignment of the network slice is performed in response to an inquiry to a network slice selection function, the inquiry comprising data indicating the unique transaction identifier for the terminal device.

3. The method of claim 1, wherein the assignment of the charging and policy scheme is performed in response to an inquiry to a policy control function, the inquiry comprising data indicating the unique transaction identifier for the terminal device.

4. A network node comprising:
at least one processor;
at least one memory including computer program code;
the at least one memory and the computer program code configured to, with the at least one processor, cause the network node to perform:
receive a registration request from a terminal device, the registration request comprising data indicating a unique transaction identifier for the terminal device,
assign on a basis of the unique transaction identifier a network slice of a mobile communication network providing communication service to the terminal device, the network slice being accessible with a session management function initiated for the terminal device,
assign a charging and policy scheme to be applied to the terminal device, the charging and policy scheme being accessible with an application function initiated for the terminal device,
generate, in response to an assignment of the network slice and an assignment of the charging and policy scheme for the communication session, an acknowledgement to the terminal device, the acknowledgement indicating an acceptance to the registration request for causing a setup of the communication session between the terminal device and the application function through a user plane function.

5. The network node of claim 4, wherein the network node is caused to perform the assignment of the network slice in response to an inquiry to a network slice selection function, the inquiry comprising data indicating the unique transaction identifier for the terminal device.

6. The network node of claim 4, wherein the network node is caused to perform the assignment of the charging and policy scheme in response to an inquiry to a policy control function, the inquiry comprising data indicating the unique transaction identifier for the terminal device.

7. The network node of claim 4, wherein the network node is an access and mobility function, AMF.

8. A communication system, comprising a network node comprising:
at least one processor;
at least one memory including computer program code;
the at least one memory and the computer program code configured to, with the at least one processor, cause the network node to perform:
receive a registration request from a terminal device, the registration request comprising data indicating a unique transaction identifier for the terminal device,
assign on a basis of the unique transaction identifier a network slice of a mobile communication network providing communication service to the terminal device, the network slice being accessible with a session management function initiated for the terminal device,
assign a charging and policy scheme to be applied to the terminal device, the charging and policy scheme being accessible with an application function initiated for the terminal device,
generate, in response to an assignment of the network slice and an assignment of the charging and policy scheme for the communication session, an acknowledgement to the terminal device, the acknowledgement indicating an acceptance to the registration request for causing a setup of the communication session between the terminal device and the application function through a user plane function.

9. A non-transitory computer-readable medium on which is stored a computer program for setting up a communication session which, when executed by at least one processor, cause a network node to perform:
receive a registration request from the terminal device, the registration request comprising data indicating a unique transaction identifier for the terminal device,
assign on a basis of the unique transaction identifier a network slice of a mobile communication network providing communication service to the terminal device, the network slice being accessible with a session management function initiated for the terminal device,
assign a charging and policy scheme to be applied to the terminal device, the charging and policy scheme being accessible with an application function initiated for the terminal device,
generate, in response to an assignment of the network slice and an assignment of the charging and policy scheme for the communication session, an acknowledgement to the terminal device, the acknowledgement indicating an acceptance to the registration request for causing a setup of the communication session between the terminal device and the application function through a user plane function.

10. The method of claim 2, wherein the assignment of the charging and policy scheme is performed in response to an inquiry to a policy control function, the inquiry comprising data indicating the unique transaction identifier for the terminal device.

11. The network node of claim 5, wherein the network node is caused to perform the assignment of the charging and policy scheme in response to an inquiry to a policy control function, the inquiry comprising data indicating the unique transaction identifier for the terminal device.

12. The network node of claim 5, wherein the network node is an access and mobility function, AMF.

13. The network node of claim 6, wherein the network node is an access and mobility function, AMF.

14. The network node of claim 11, wherein the network node is an access and mobility function, AMF.

* * * * *